Patented July 9, 1935

2,007,243

UNITED STATES PATENT OFFICE 2,007,243

NONCORROSIVE AQUEOUS LIQUID

Frederick B. Downing, Carneys Point, N. J., and Richard G. Clarkson, Wilmington, Del., assignors to E. I. du Pont de Nemours & Company, Wilmington, Del., a corporation of Delaware No Drawing. Application December 12, 1931, Serial No. 580,730

7 Claims. (Cl. 252—5)

This invention relates to non-corrosive aqueous liquids and, more particularly, to non-corrosive anti-freeze liquids for automobile radiators, and the like.

The corrosive effect of aqueous liquids on metals, due to the combined action of moisture and oxygen, is well known and many expedients to eliminate or counteract this effect in liquids used in automobile radiators, house radiators used in hot water systems, boilers, et cetera, have been proposed. The anti-freeze liquids used today for automobile radiators employ two classes of freezing point depressants, namely, electrolytes, such as highly soluble salts, for example, calcium chloride, sodium lactate, and magnesium chloride, or non-electrolytes, such as methanol, ethanol, glycerol, ethylene glycol, and some times glucose and honey. The anti-freeze liquids employing non-electrolytes do not have as great a corrosive action on metals as those employing electrolytes, but still the corrosive action is considerably greater than that of water alone and constitutes a distinct disadvantage in practical use.

An object of the present invention is to provide a non-corrosive aqueous liquid. A further and more specific object of the invention is to provide a non-corrosive anti-freeze liquid employing a non-electrolyte freezing point depressant. Other objects will be apparent from the description of the invention given hereinafter.

The above objects are accomplished according to the present invention by the use in aqueous liquids, as a corrosion inhibitor, of a soluble oil or equivalent agent and, more specifically, by the addition of a soluble oil or equivalent agent to an anti-freeze mixture comprising water and a non-electrolyte freezing point depressant, such as ethanol, methanol, glycerol, ethylene glycol, glucose, or honey.

By the term "soluble oil" as used herein is meant a composition comprising a neutral oil immiscible with water, containing an emulsifying agent in solution in sufficient amount so that the composition will spontaneously form a stable emulsion when poured into water. The most effective oil to be used in the soluble oil is the oil most resistant to oxidation, namely, a refined paraffin oil, but other oils, such as non-drying oils of the vegetable or animal type, for example, palm oil, cocoanut oil, and wool fat, may be used effectively. Also other liquids having a boiling point higher than water and immiscible with water may be used. Among these may be mentioned xylene, lauryl, alcohol, diphenyl ether, o-dichlorobenzene, nitrobenzene, dichloro diethyl ether, tetrachloroethane, cyclohexanone, cyclohexanol, and acetophenone.

The emulsifying agent to be used in the corrosion inhibitor may vary widely. The following emulsifying agents are suitable for the preparation of soluble oils; soap and oleic acid, sulphonated castor oil and oleic acid, petroleum sludge acids, and sulphonated alkylated polynuclear aromatic hydrocarbons. The latter are not commonly used in the preparation of soluble oils. Small additions of other materials, such as alcohol, acetone, or pine oil, may be made to the corrosion inhibitor for the purpose of obtaining a homogeneous mixture.

The proportion of emulsifying agent in the soluble oil may vary widely, but it has been found that a proportion of 50-90% of oil, or other high boiling liquid, to 50-10% of emulsifying agent is most suitable. In any event, the proportion of emulsifying agent should be sufficient so that the corrosion inhibitor will form a spontaneous stable emulsion when poured into water.

It has been found that if a dilute emulsion formed by the addition to water of the type of corrosion inhibitor disclosed above is used instead of water in the cooling system of an automobile radiator, the metal is thinly and uniformly coated with an almost imperceptible film of oil, and this film of oil serves to protect the metal perfectly from the joint action of oxygen and moisture. The emulsifying agent present in the corrosion inhibitor serves to prevent the oil from agglomerating on the surface of the liquid or in spots on the metal surface, as water immiscible oil would do in the absence of an emulsifying agent. The film of oil produced in this manner is so thin, possibly only mono-molecular in thickness, that it does not cause faulty heat transfer, nor cause any clogging of radiator tubes.

The following examples are given by way of illustrating the invention and showing the effectiveness of the aqueous liquids according to the present invention as compared to similar liquids omitting the corrosion inhibitor. The method of testing used in these examples consisted in heating the liquid to 80° C., the approximate temperature of an automobile radiator under operating conditions, in a flask under a reflux condenser. Strips of steel and strips of brass, representing the metals of the radiator, were placed in the liquid being tested and a continuous stream of oxygen was bubbled through the liquid. Under these conditions the corrosion of the metal was many times greater than in a radiator where the oxygen concentration is only a small fraction of that prevailing in the test. In every case controls were run, i. e., two samples of the same liquid were used, one with the corrosion inhibitor and one without.

*Example 1.*—Two samples were run, each of 500 cc. of a 35% solution of pure glycerol, to one of which was added 5 grams of a soluble oil containing 60% refined paraffin oil and 40% sulphonated petroleum. After five hours' aeration the steel strips in the solution not containing the corrosion inhibitor were badly rust spotted and the brass strips considerably discolored, while after 24 hours' aeration the steel strips were thickly coated with rust and the brass strips considerably oxidized. At the end of 24 hours' aeration the steel strips in the solution containing the corrosion inhibitor were clean and bright with no signs of rust, and the brass strips had darkened only slightly.

*Example 2.*—Two samples were run, each of 500 cc. of a 40% solution of ethanol, to one of which was added 5 grams of a soluble oil containing 70% refined paraffin oil and 30% soap and oleic acid. After 24 hours' aeration at 80° C., the strips in the solution not containing the corrosion inhibitor were covered with rust and somewhat corroded, whereas the strips in the solution containing the corrosion inhibitor were clean and bright.

*Example 3.*—Two 40% methanol solutions of 500 cc. each were used, one containing 5 grams of a soluble oil comprising 65% refined paraffin oil and 35% Turkey red oil and oleic acid. After 24 hours' aeration, the strips in the solution containing no corrosion inhibitor were badly corroded with a thick layer of rust, whereas the strips in the solution containing the corrosion inhibitor were clean and bright.

*Example 4.*—Two 35% ethylene glycol solutions of 500 cc. each were used, one of said solutions containing 5 grams of a soluble oil comprising 55% palm oil and 45% of sulphonated oleic acid. After 24 hours' aeration the strips in the solution containing no corrosion inhibitor were considerably rusted, whereas the strips in the other solution were clean and bright.

*Example 5.*—Two 40% solutions of ethylene glycol mono-ethyl ether of 500 cc. each were used, one of said solutions containing 5 grams of a corrosion inhibitor comprising 55% pine oil and 45% of an aqueous solution of di-isopropylnaphthalene sodium sulphonate. After 24 hours' aeration the strips in the solution containing no corrosion inhibitor were covered with rust and the strips in the other solution were clean and bright.

*Example 6.*—In this example 500 cc. of pure water was used as the control and the other solution comprised 500 cc. of pure water containing 5 grams of a soluble oil comprising 20% naphthenic acid salts, 50% refined paraffin oil and 30% pine oil. After 24 hours' aeration the strips in the pure water were badly rusted, whereas the strips in the solution containing the corrosion inhibitor were clean and bright.

The above examples clearly show that the corrosion inhibitor according to the present invention is effective with water itself or with aqueous solutions of non-electrolytes. The proportion of corrosion inhibitor to be employed may be varied widely and, in fact, the amount necessary for any particular system is best determined by experiment, which can be readily carried out.

The proportions given in the examples are only illustrative; as will be apparent to those skilled in the art, they may be greatly varied under different conditions.

The corrosion inhibitor, as shown in Example 6, may be used with water alone and could be used in this manner for many purposes, such as in boilers, house radiators, and the like. Where an anti-freeze liquid is desired, the corrosion inhibitor may be mixed with the water and the non-electrolyte freezing point depressant added subsequently, or the corrosion inhibitor may be added to the non-electrolyte freezing point depressant, which can subsequently be added to the water. In either case the corrosion inhibitor will spontaneously form a stable emulsion when brought into contact with the water and will function efficiently.

Other ingredients may be added to the corrosion inhibitor for various purposes, such as triethanolamine or ortho toluidine which serve to neutralize any acids formed by oxidation of the solute. Ortho toluidine, as shown by Calcott and Walker United States Patent 1,797,402, tends to prevent the corrosion of brass and copper by alcoholic liquids and therefore may be advantageously added to the corrosion inhibitor.

The non-corrosive aqueous liquids according to the present invention are not limited to use in automobile radiators, as they may likewise be used with equal effectiveness in all radiators for gasoline engines, in circulating hot water systems, steam boilers, and in other places where it is desired to prevent corrosion of metal surfaces in contact with aqueous liquids.

The corrosion inhibitor of the present invention effectively prevents corrosion of metals without interfering with the heat transfer between metal and the aqueous liquid containing the corrosion inhibitors. Furthermore, the oil is uniformly dispersed throughout the aqueous solution and has no tendency to agglomerate in any one particular place, or to clog radiator tubes, and the like, as ordinary water immiscible oils will do in the absence of emulsifying agents.

As many apparently widely different embodiments of this invention may be made without departing from the spirit and scope thereof, it is to be understood that the invention is not limited to the specific embodiments thereof except as defined in the appended claims.

We claim:

1. A fluid medium suitable for use in heat-exchange devices and the like comprising water and a small percent of a corrosion inhibitor comprising 50–90% of an organic liquid having a higher boiling point than water and immiscible with water, and 50–10% of an emulsifying agent of the group consisting of soap and oleic acid, sulphonated castor oil and oleic acid, and sulphonated alkylated polynuclear aromatic hydrocarbons.

2. A fluid medium suitable for use in heat-exchange devices and the like comprising water and a small percent of a corrosion inhibitor comprising a mixture of oil and an emulsifying agent and ortho toluidine.

3. A fluid medium suitable for use in heat-exchange devices and the like comprising water and a small percent of a corrosion inhibitor comprising 50–90% of refined paraffin oil and 50–10% of an emulsifying agent from the group consisting of soap and oleic acid, sulphonated castor oil and oleic acid, and sulphonated alkylated polynuclear aromatic hydrocarbons.

4. A fluid medium suitable for use in heat-exchange devices and the like comprising water, a non-electrolyte freezing point depressant and a small percent of a corrosion inhibitor comprising 50-90% of an oily organic material having a higher boiling point than water and immiscible with water, and 50-10% of an emulsifying agent of the group consisting of soap and oleic acid, sulphonated castor oil and oleic acid, and sulphonated alkylated polynuclear aromatic hydrocarbons.

5. A fluid medium suitable for use in heat-exchange devices and the like comprising water, a non-electrolyte freezing point depressant, and a small percent of a corrosion inhibitor comprising 50-90% of refined paraffin oil and 50-10% of an emulsifying agent from the group consisting of soap and oleic acid, sulphonated castor oil and oleic acid, and sulphonated alkylated polynuclear aromatic hydrocarbons.

6. A fluid medium suitable for use in heat-exchange devices and the like comprising water, a freezing point depressant from the group consisting of ethanol, methanol, glycerol, and ethylene glycol, and a small percent of a corrosion inhibitor comprising 50-90% of refined paraffin oil and 50-10% of an emulsifying agent of the group consisting of soap and oleic acid, suphonated castor oil and oleic acid, and sulphonated alkylated polynuclear aromatic hydrocarbons.

7. A fluid medium suitable for use in heat-exchange devices and the like comprising water and a small percent of a corrosion inhibitor comprising a mixture of ortho-toluidine, oil and an emulsifying agent of the group consisting of soap and oleic acid, sulphonated castor oil and oleic acid, petroleum sludge acids, and sulphonated alkylated polynuclear aromatic hydrocarbons.

FREDERICK B. DOWNING.
RICHARD G. CLARKSON.